US011967473B2

(12) United States Patent
Ha

(10) Patent No.: US 11,967,473 B2
(45) Date of Patent: Apr. 23, 2024

(54) HOME APPLIANCE INCLUDING KNOB ASSEMBLY

(71) Applicant: LG ELECTRONICS INC., Seoul (KR)

(72) Inventor: Yeonsik Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 241 days.

(21) Appl. No.: 17/603,301

(22) PCT Filed: Apr. 16, 2020

(86) PCT No.: PCT/KR2020/095070

§ 371 (c)(1),
(2) Date: Oct. 12, 2021

(87) PCT Pub. No.: WO2020/214014

PCT Pub. Date: Oct. 22, 2020

(65) Prior Publication Data

US 2022/0196245 A1 Jun. 23, 2022

(30) Foreign Application Priority Data

Apr. 17, 2019 (KR) ........................ 10-2019-0045100

(51) Int. Cl.

*H01H 19/14* (2006.01)
*F24C 3/12* (2006.01)
*G05G 1/10* (2006.01)

(52) U.S. Cl.

CPC ............. *H01H 19/14* (2013.01); *F24C 3/124* (2013.01); *F24C 3/126* (2013.01); *G05G 1/10* (2013.01)

(58) Field of Classification Search

CPC .......... F24C 3/103; F24C 3/124; F24C 3/126; H01H 19/14; G05G 1/08; G05G 1/10; G05G 5/04; G05G 5/05
See application file for complete search history.

(56) References Cited

U.S. PATENT DOCUMENTS 4,920,823 A 5/1990 Mohr et al.
10,345,514 B2 * 7/2019 Kozinski ................ F24C 7/082
(Continued)

FOREIGN PATENT DOCUMENTS

EP 0 327 175 9/1993
KR 20-1991-0012420 7/1991
(Continued)

OTHER PUBLICATIONS

International Search Report (with English Translation) and Written Opinion dated Aug. 10, 2020 issued in Application No. PCT/KR2020/095070.

*Primary Examiner* — Adam D Rogers
(74) *Attorney, Agent, or Firm* — KED & Associates LLP

(57) ABSTRACT

A home appliance may include a first panel having a through hole; a bracket disposed outside of the first panel, configured to cover the through hole, and fixed to the first panel; a shaft support provided on the bracket, extending in a frontward-rearward direction, and formed in the shape of a tube; a knob disposed outside of the first panel; a knob ring connected to the bracket and surrounding a circumference of the knob; a joint support connected to an end of a rear of the shaft support; a universal joint rotatably supported by the joint support; a valve assembly disposed at a rear of the universal joint; a first adjustment shaft; and a second adjustment shaft having a front end connected to a second end of the universal joint and a rear end connected to the valve assembly.

20 Claims, 10 Drawing Sheets

(56) References Cited

U.S. PATENT DOCUMENTS

| | | | | |
|---|---|---|---|---|
| 10,663,172 | B2 | 5/2020 | Ha | |
| 10,684,021 | B2 * | 6/2020 | Ha | F24C 3/103 |
| 10,746,409 | B2 * | 8/2020 | Ha | F24C 3/103 |
| 10,794,597 | B2 * | 10/2020 | Ha | G05G 1/08 |
| 10,890,330 | B2 * | 1/2021 | Ha | F24C 3/126 |
| 10,935,249 | B2 * | 3/2021 | Ha | F24C 3/103 |
| 11,143,412 | B2 * | 10/2021 | Ha | F24C 3/124 |
| 11,162,685 | B2 * | 11/2021 | Ha | F24C 3/103 |
| 11,231,179 | B2 * | 1/2022 | Ha | G05G 5/04 |
| 11,231,180 | B2 * | 1/2022 | Ha | F24C 3/124 |
| 11,262,078 | B2 * | 3/2022 | Ha | F24C 3/124 |
| 11,268,701 | B2 * | 3/2022 | Ha | G01D 5/145 |
| 11,340,648 | B2 * | 5/2022 | Ha | G05G 1/12 |
| 11,371,713 | B2 * | 6/2022 | Ha | F24C 7/082 |
| 11,566,792 | B2 * | 1/2023 | Ha | G01B 7/003 |
| 11,635,212 | B2 * | 4/2023 | Ha | G05G 1/10<br>74/553 |
| 11,635,782 | B2 * | 4/2023 | Ha | G05G 5/28<br>251/86 |
| 11,649,967 | B2 * | 5/2023 | Ha | F24C 3/124<br>74/553 |
| 2019/0032921 | A1 | 1/2019 | Ha et al. | |
| 2023/0243508 | A1 * | 8/2023 | Ha | F24C 3/124<br>74/553 |

FOREIGN PATENT DOCUMENTS

| | | |
|---|---|---|
| KR | 20-1998-0020482 | 7/1998 |
| KR | 20-0253012 | 11/2001 |
| KR | 10-2018-0095438 | 8/2018 |
| KR | 10-2018-0123464 | 11/2018 |

* cited by examiner

HOME APPLIANCE INCLUDING KNOB ASSEMBLY

CROSS-REFERENCE TO RELATED PATENT APPLICATIONS

This application is a U.S. National Stage Application under 35 U.S.C. § 371 of PCT Application No. PCT/KR2020/095070, filed Apr. 16, 2020, which claims priority to Korean Patent Application No. 10-2019-0045100, filed Apr. 17, 2019, whose entire disclosures are hereby incorporated by reference.

TECHNICAL FIELD

A home appliance including a knob assembly is disclosed herein.

BACKGROUND ART

Home appliances are provided with a knob for controlling operation of the home appliances. In particular, a knob installed in a cooking appliance is connected to a valve and the like and used for an adjustment of a thermal power and the like. A cooking appliance includes the same number of knobs as the number of burners.

The knob is installed in a way that the knob rotates around a rotation axis. In some cases, a plurality of knobs is not aligned accurately, making an exterior of the cooking appliance less attractive, due to measurement errors and assembly deviations during a manufacturing process. When a rotation center of a valve installed in a housing is not accurately aligned with a rotation center of a knob disposed outside a panel, the knob cannot operate smoothly.

As a related art, a knob assembly structure is disclosed in KR Patent Publication No. 10-2018-0095438. In the knob assembly structure, a position of a knob is determined by a front panel regardless of a position of a valve installed in a housing. Additionally, in the structure suggested, a valve shaft connected to the valve and a knob shaft connected to the knob are connected by a universal joint.

However, in the structure, a component supporting the universal joint is fixed and disposed onto a rear surface of the front panel, and a structure supporting the knob is disposed at a front of the front panel. Thus, for management and repairs of the universal joint or the valve, almost all of the components of the knob assembly need to be disassembled, causing inconvenient results.

Further, the knob can be easily aligned according to the related art. However, the component supporting the universal joint and a component supporting the knob shaft are implemented individually and fixed to a different portion. Thus, assembly and alignment of the knob is still inconvenient.

DESCRIPTION OF INVENTION

Technical Problem

To solve the above problems, an objective of the present disclosure is to provide a knob assembly structure in which a knob is aligned correctly and assembled more accurately and simply.

Another objective of the present disclosure is to provide a knob assembly structure in which a knob operates smoothly despite misalignment of rotation centers of a knob and a valve.

Yet another objective of the present disclosure is to provide a knob assembly structure that ensures easy of management and repairs.

Technical Solution

To achieve the above objectives, provided is a knob assembly including a bracket in which a component supporting a universal joint and a component supporting a first adjustment shaft of a knob are integrated.

According to the present disclosure, provided is a knob assembly in which the bracket supporting the first adjustment shaft of the knob is disposed on a front surface of a first panel from a space in front of the first panel.

According to the present disclosure, provided is a knob assembly provided with a bracket including a first leaf spring structure elastically supporting the first adjustment shaft in a direction in which the first adjustment shaft of the knob is aligned correctly, and a second leaf spring structure elastically supporting the universal joint in a direction in which the universal joint is aligned correctly.

Specifically, a knob assembly in an embodiment may be disposed at a first panel 11 provided with a through opening 111.

The knob assembly may include a support-alignment member 4 provided with a bracket 40 configured to cover the through opening 111 and fixed to a front surface of the first panel 11, a shaft supporting member 43 provided to the bracket 40, extended in a front-rear direction and formed into a tube, and a joint supporting member 46 connected to an end of a rear of the shaft supporting member 43.

A knob 2 may be disposed outside the first panel 11 at fronts of the through opening 111 and the bracket 40.

A knob ring 6 may be fixed to the bracket 40 and surround a circumference of the knob 2.

A valve assembly 80 may be installed in a space at a rear of the first panel 11.

A universal joint 7 may be disposed in the space at the rear of the first panel 11 and rotatably supported by the joint supporting member 46.

The universal joint 7 may be disposed at a front of the valve assembly 80.

A first adjustment shaft 91 may be connected to a rear of the knob 2.

An end of a front of the first adjustment shaft 91 may be connected to the knob 2 and an end of a rear thereof may be connected to a first end member 75 of the universal joint 7. Additionally, the first adjustment shaft 91 may be connected to and rotate together with the knob 2 and the universal joint 7.

The first adjustment shaft 91 may be inserted into the shaft supporting member 43, rotatably supported by the shaft supporting member 43, and supported by the shaft supporting member 43 in a way that the first adjustment shaft 91 is allowed to slide in an axis direction.

The universal joint 7 and a valve 8 may be connected to a second adjustment shaft 92. An end of a front of the second adjustment shaft 92 may be connected to a second end member 76 of the universal joint 7, and an end of a rear thereof may be connected to the valve assembly 80.

A radius-wise movement of the first end member 75 of the universal joint 7 may be limited by the joint supporting member 46. Thus, the first adjustment shaft may be readily connected to the first end member 75.

The first end member 75 of the universal joint 7 may be supported by the joint supporting member 46 in a way that the first end member 75 is allowed to slide in the axis direction.

The first end member 75 of the universal joint 7 may be prevented from sliding further forward than a predetermined position by the joint supporting member 46. Thus, the first adjustment shaft may be easily disassembled from the first end member 75 readily.

The joint supporting member 46 may be connected to the end of the rear of the shaft supporting member 43, and provided with a flange 461 extended outward in a radial direction and a cylinder 462 extended rearward from the flange 461.

An inner diameter of the cylinder 462 may be greater than an inner diameter of the end of the rear of the shaft supporting member 43.

The first end member 75 may be provided with a first shaft connecting member 751 inserted into an inner space of the cylinder 462, and the first shaft connecting member 751 may be provided with an inserting tapered surface 7511 having a diameter that decreases toward a front, on an outer circumferential surface of an end of a front thereof.

The cylinder 462 may be provided with an accommodating tapered surface 4623 having an inner diameter that decreases toward a front, on an inner circumferential surface thereof.

An inner diameter of an end of a rear of the accommodating tapered surface 4623 may be greater than an outer diameter of an end of a rear of the inserting tapered surface 7511, making initial assembly more convenient.

The bracket 40 may include a first member 41 contacting the front surface of the first panel 11 and fixed to the first panel 11, and a second member 42 disposed further outward than the first member 41 in the radial direction and connected to the knob ring 6.

The first member 41 may not be exposed forward in a state in which the knob 2 is disposed, and exposed forward in a state in which the knob 2 is removed, since the first member 41 is disposed at the rear of the knob 2.

The first member 41 may be fixed to the first panel 11 by a fastening member S that is approachable from a space in front of the first member 41. Thus, the bracket 40 may be readily attached and detached.

The first adjustment shaft 91 may be detachably connected to the first end member 75 of the universal joint 7. Thus, the knob 2 and the first adjustment shaft 91 may readily separate in front of the first panel.

The first adjustment shaft 91 may be provided with a large diameter portion 912 having a diameter contacting a first supporting surface 441 provided at an end of a front the shaft supporting member 43, and a small diameter portion 913 having a diameter contacting a second supporting surface 451 provided at the end of the rear of the shaft supporting member 43. Thus, the first adjustment shaft 91 may be readily fitted into the shaft supporting member 43.

The large diameter portion 912 and the small diameter portion 913 may be connected by an inclined portion 914 having a diameter that decreases from the large diameter portion toward the small diameter portion. Thus, the first adjustment shaft 91 may be fitted into the shaft supporting member 43 more readily.

The shaft supporting member 43 may include a first supporting member 44 extended forward from the bracket 40, and a second supporting member 45 extended rearward from the bracket 40. The joint supporting member 46 may be connected to an end of a rear of the second supporting member 45. In the structure, two points in which the first adjustment shaft is supported may be farthest from each other.

The shaft supporting member 43 and the joint supporting member 46 may be provided with a first slit 47 extended from a predetermined position of the shaft supporting member 43 to a rear end of the joint supporting member 46 and cut rearward.

The shaft supporting member 43 may be provided with a second supporting surface 451 configured to support a circumference of the first adjustment shaft 91, at a rear end thereof.

In a state in which the first adjustment shaft 91 is not inserted into the shaft supporting member 43, an inner diameter of the supporting surface 451 may be less than a diameter of a portion 913 of the first adjustment shaft 91, supported by the supporting surface 451. Then a leaf spring structure may be implemented, and the first adjustment shaft 91 may be aligned and supported more effectively.

The joint supporting member 46 may be provided with a second slit 48 extended to the rear end of the joint supporting member 46 from a position different from the position of the first slit 47 and cut rearward. Thus, the joint supporting member 46 itself may be another leaf spring structure.

The first supporting surface 441 and the second supporting surface 451 may be respective provided at the end of the front of the shaft supporting member 43 and the end of the rear thereof. An inner diameter of the first supporting surface 441 may be greater than an inner diameter of the second supporting surface 451, and a tapering sector 452 having an inner diameter that increases from the second supporting surface 451 toward a front may be further provided on an inner circumferential surface of the shaft supporting member 43, thereby making it easier to insert the first adjustment shaft.

The second adjustment shaft 92 may slide in the axis direction by a first distance D1 between a press position P1 in which the valve 8 is pressed and a non-press position P2 in which the valve 8 is not pressed.

In a state in which the second adjustment shaft 92 is in the non-press position P2, the first end member 75 may slide relatively with respect to the second end member 76 by a second distance D2 between a third position P3 in which the first end member 75 of the universal joint 7 moves rearward and interferes with the second end member 76 and a fourth position P4 in which a forward movement of the first end member 75 is limited by the joint supporting member 46.

The knob 2 and the first adjustment shaft 91 may slide with respect to the bracket 40 in the axis direction by a distance the same as or greater than a total of the first distance D1 and the second distance D2.

A size of the through opening 111 may be greater than a size of the universal joint 7. Thus, the universal joint 7 may be put into and out through the through opening 111.

Advantageous Effect

In a knob assembly according to the present disclosure, a knob may be disposed in alignment on a first panel, thereby ensuring improvement in aesthetic qualities of an exterior of a home appliance.

In the knob assembly, a knob and a universal joint may be aligned and supported by a single bracket, thereby ensuring a simple structure and easy assembling and maintenances.

In the knob assembly, manufacturing and maintenance of the knob assembly can be ensured as a result of disassembling of a bracket without disassembling a housing of a home appliance.

Specific effects are described together with the above-described effects in the section of Detailed Description, thereby ensuring ease of management and repairs.

DESCRIPTION OF REFERENCE NUMERAL

Figure 1:
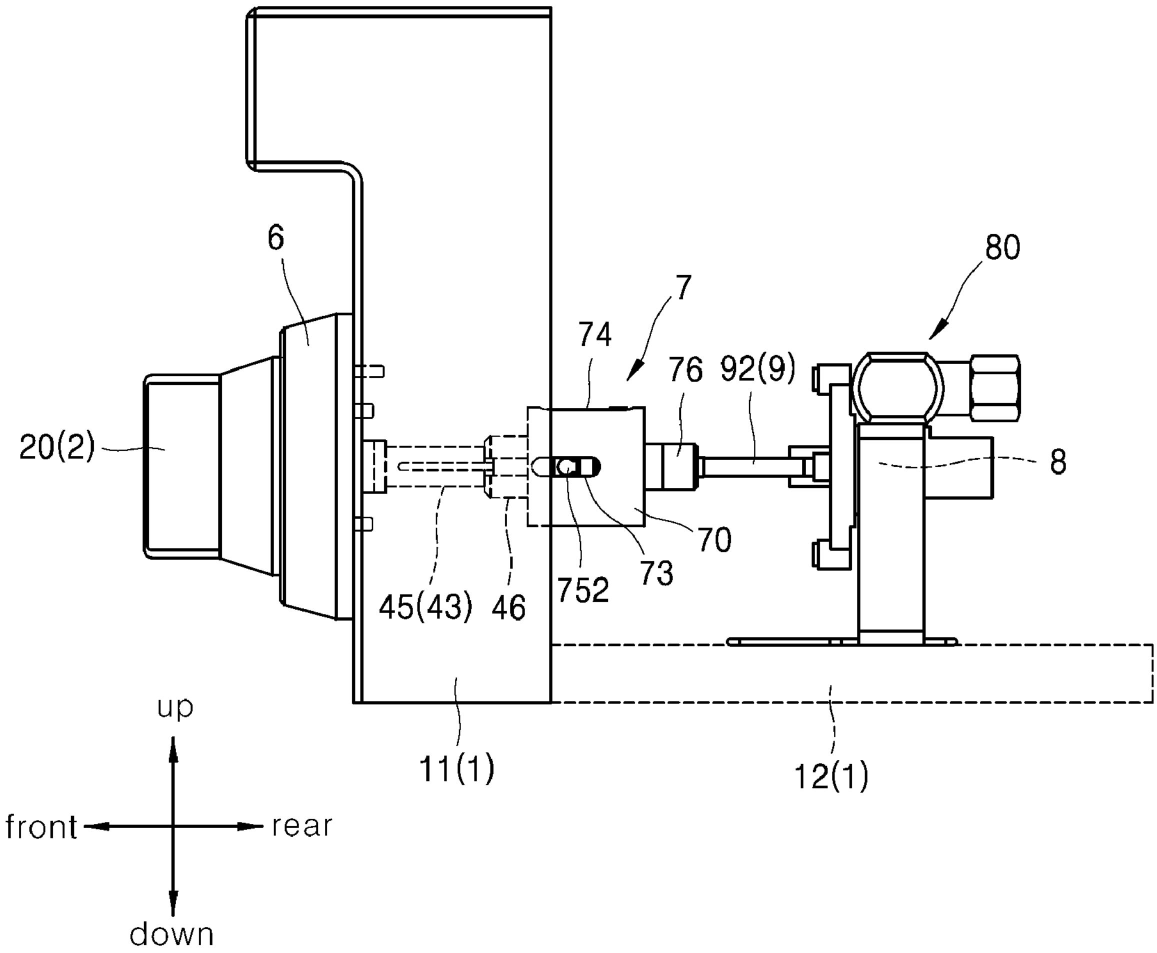
FIG. 1 is a side view showing a knob assembly applied to a cooking appliance according to the present disclosure.

1: housing 11: first panel 111: through opening 112: temporary alignment hole 113: first threaded hole 114: second threaded hole 12: second panel 2: knob (adjusting part) 20: knob member 21: handle 22: outer circumferential surface 23: second stopper 3: first stopper 4: support-alignment member 40: bracket 41: first member 410: first mounting hole 411: opening 412: service hole 413: rib 42: second member 420: second mounting hole 422: recess 43: shaft supporting member 44: first supporting member 441: first supporting surface 45: second supporting member 451: second supporting surface 452: tapered sector 46: joint supporting member 461: flange 462: cylinder 4623: accommodating tapered surface 47: first slit 48: second slit 49: temporary fixation boss 6: knob ring 60: ring member 62: inner circumferential surface 63: rear surface 631: groove 632: threaded groove 7: universal joint 70: cylinder member 71: opening end 72: closing end 721: through hole 73: first slot 74: second slot 75: first end member 751: first shaft connecting member 7511: inserting tapering surface/inserted tapered surface 752: first slide shaft 7521: rotational angle stopper 753: first reinforcing cap 754: first reinforcing insert 76: second end member 761: second shaft connecting member 762: second slide shaft 763: second reinforcing cap 764: second reinforcing insert 77: spring 8: valve (adjusted member) 80: valve assembly 83: spring 9: adjustment shaft 91: first adjustment shaft 911: first rotational engagement shape 912: large diameter portion 913: small diameter portion 914: inclined portion 915: inserting portion 92: second adjustment shaft 921: second rotational engagement shape S: fastening member (screw)

DETAILED DESCRIPTION OF EXEMPLARY EMBODIMENT

Hereunder, a preferred embodiment according to the present disclosure is described with reference to the accompanying drawings.

The inventive subject matter may be embodied in various different forms, and should not be construed as being limited only to the embodiments set forth herein. Rather, the embodiments are provided as examples so that the disclosure will be thorough and complete, and will fully convey the inventive subject matter to those skilled in the art.

[Knob Assembly]

An entire configuration of a knob assembly according to the disclosure is described with reference to FIGS. 1 to 4.

The knob assembly may be applied to home appliances in which operation of the appliances is controlled as a result of a rotation of a knob 2. Among the home appliances, a gas range may be a typical home appliance. The knob 2's rotation displacement directly relates to an opening degree of a valve 8. As a rotation angle of the knob 2 increases, an opening degree of the valve 8 increases. When the valve is opened for the first time, the knob 2 rotates while being pressed in an axis direction, and then the valve 8 is opened, as a means to prevent a gas leakage accident.

An approximate shape of a home appliance is determined by a housing 1. The housing 1 may include a first panel 11, on a front surface thereof. The housing 1 may be provided with a second panel 12 which may be manufactured as an individual component in addition to the first panel 11 and defining a predetermined space therein. The first panel 11 and the second panel 12, for example, may be manufactured in a way that a metallic plate is bent.

In description of the embodiment, an axis direction may be defined as a direction in which an adjustment shaft 9 extends. A radial direction may be defined as a direction closer to or farther from the axis. A circumferential direction or a circumference direction may be defined as a direction in which the axis is surrounded.

In two directions along a shaft passing through the knob 2 and the valve 8, a direction from the valve 8 to the knob 2 may be referred to as a forward (frontward) direction, and a direction from the knob 2 to the valve 8 may be referred to as a rearward direction. In the case of a home appliance, a front may be a space approached by a user, and a rear may be a space opposite to the front.

An upward direction (up) may be defined as a direction opposite to a direction in which gravity is applied, and a downward direction (down) may be defined as a direction parallel with the direction in which gravity is applied, in a state in which the home appliance in the embodiment is installed for use.

According to the present disclosure, a plurality of knobs 2 disposed at a front of the first panel 11 may be aligned very accurately, and the adjustment shaft 9 connecting the knob 2 and the valve 8 may operate smoothly, although the first panel 11 and the second panel 12 are implemented as an individual component and the valve 8 and the knob 2 are assembled without accurate control over relative positions of the valve 8 and the knob 2.

A plurality of through openings 111 may be formed in predetermined positions of the first panel 11. A knob 2 may be disposed respectively at fronts of the plurality of through openings 111. The plurality of through openings 111 may be circular holes. A plurality of threaded holes 113 may be formed around the through opening 111. A screw thread may by formed on an inner circumferential surface of a first threaded hole 113 and fastened to a screw S. In the embodiment, 4 first threaded holes 113 are disposed at 90-degree intervals with respect to a shaft, for example.

On the first panel 11, a pair of second threaded holes 114 may be formed further outward than the through opening 111 in a radial direction. A screw thread may be formed on an inner circumferential surface of the second threaded hole 114 and fastened to a screw S.

On the first panel 11, a temporary alignment hole 112 may be formed further outward than the through opening 111 in the radial direction. A temporary fixation boss 49 of a support-alignment member 4 may be fitted into the temporary alignment hole 112 such that the support-alignment member 4 is temporarily fixed and aligned to the first panel 11.

In the embodiment, the second threaded hole 114 and the temporary alignment hole 112 are disposed further upward than the through opening 111, and the temporary alignment hole 112 is disposed further outward than the second threaded hole 114 in the radial direction, for example. However, the positions of the second threaded hole 114 and the temporary alignment hole 112 may not be limited.

A valve assembly 80 may be disposed in an inner space of the cooking appliance, which is disposed further rearward than the first panel 11. The valve assembly 80 may be fixed to the second panel 12 defining a bottom surface of the cooking appliance. A valve 8 may be built into the valve assembly 80. A second adjustment shaft 92 may be disposed at a front of the valve 8.

The second adjustment shaft 92 may be elastically supported by a spring 83, built into the valve assembly 80, forward. The second adjustment shaft 92 may slide by a first distance D1 between a non-press position P2 in which the second adjustment shaft 92 is moved forward by elasticity of the spring 83 and a press position P1 in which the second adjustment shaft 92 slides rearward against the elasticity of the spring 83.

When the second adjustment shaft 92 is pressed rearward and is in the press position P1, the valve 8 and the second adjustment shaft 92 may engage with each other in a rotation direction. When the second adjustment shaft 92 is in the non-press position P2, the second adjustment shaft 92 and the valve 8 may not engage with each other in the rotation direction. Accordingly, the valve 8 may be adjusted when the second adjustment shaft 92 rotates in the press position P1, while the valve 8 may not be adjusted when the second adjustment shaft 92 rotates in the non-press position P2.

An end of a front of the second adjustment shaft 92 may connect to a second end member 76 of a universal joint 7.

The universal joint 7 may include a cylinder member 70 having a cylinder shape and aligned with an adjustment shaft 9 in the axis direction, a first end member 75 provided at a front end of the cylinder member 70, and a second end member 76 provided at a rear end of the cylinder member 70. The first end member 75 and the second end member 76 may slide with respect to the cylinder member 70 in the axis direction. A spring 77 such as a compression coil spring may be installed between the two end members 75, 76. The spring 77 may apply elasticity to the two end members 75, 76 in a direction in which the two end members 75, 76 become far away from each other.

Figure 8:
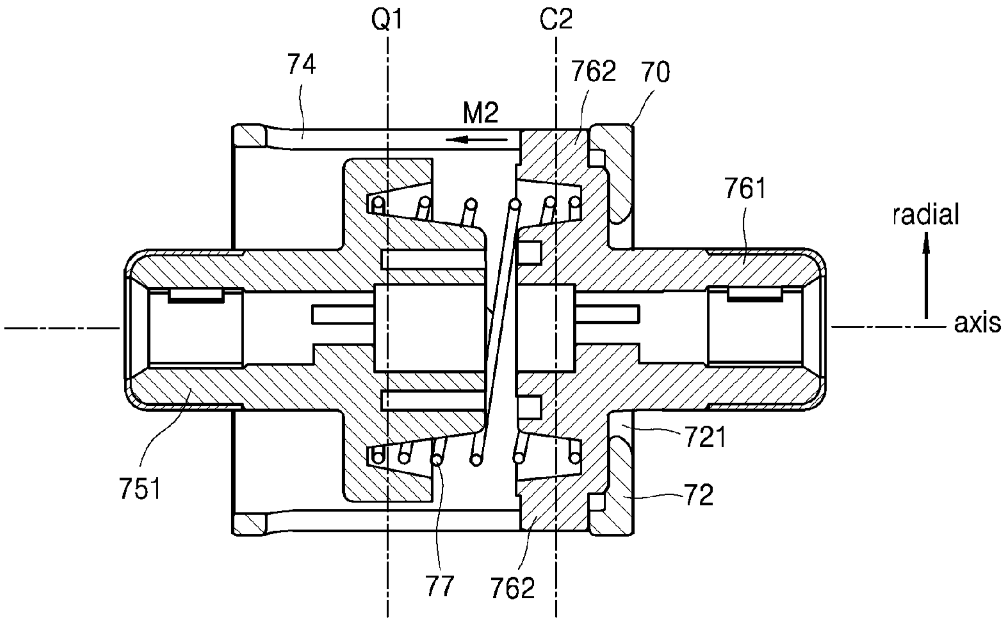
FIG. 8 is a cross-sectional view showing the universal joint cut into a flat surface including an axis, and a rotation center line C2 of a second end member, in FIG. 7.
Figure 9:
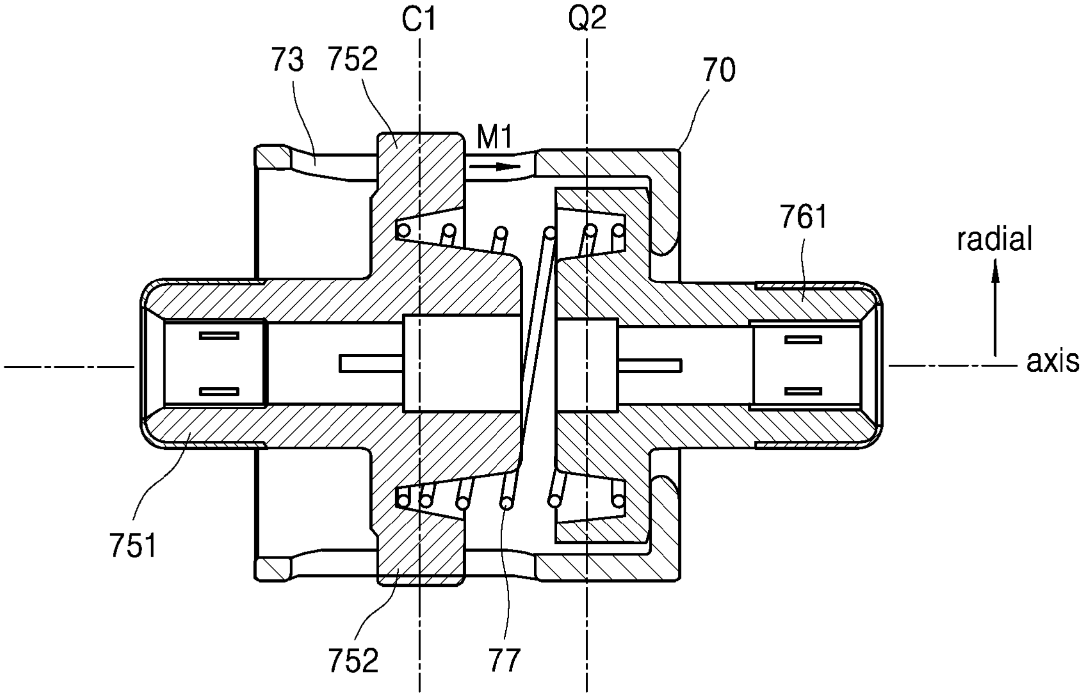
FIG. 9 is a cross-sectional view showing the universal joint cut into a flat surface including the axis, and a rotation center line C1 of a first end member, in FIG. 7.
Figure 10:
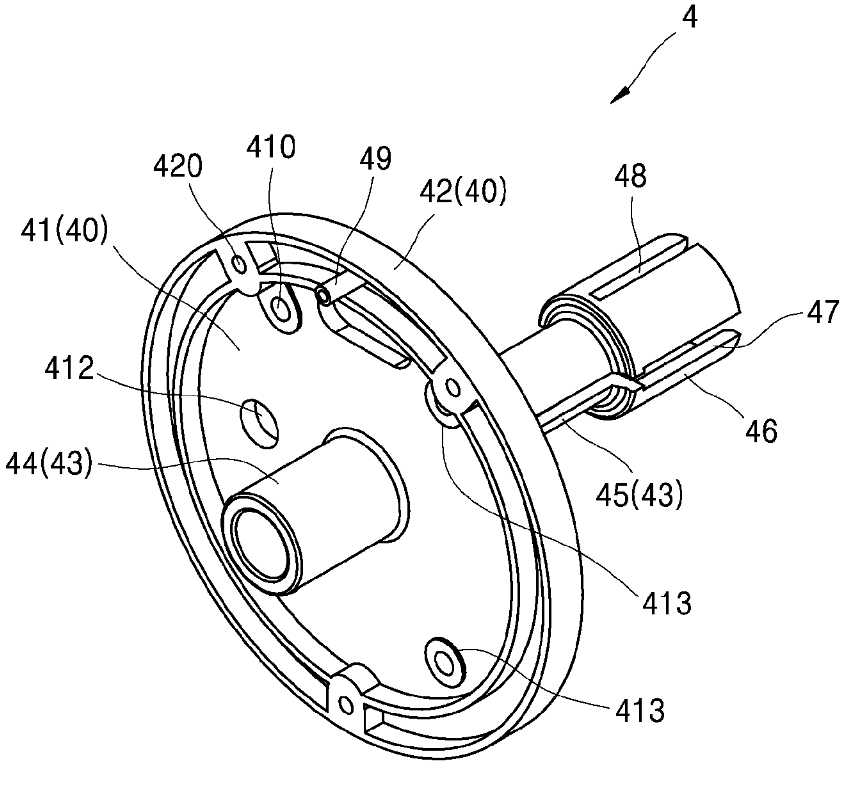
FIGS. 10 to 12 are respectively a front perspective view, a rear perspective view and a cross-sectional view showing a bracket.
Figure 11:
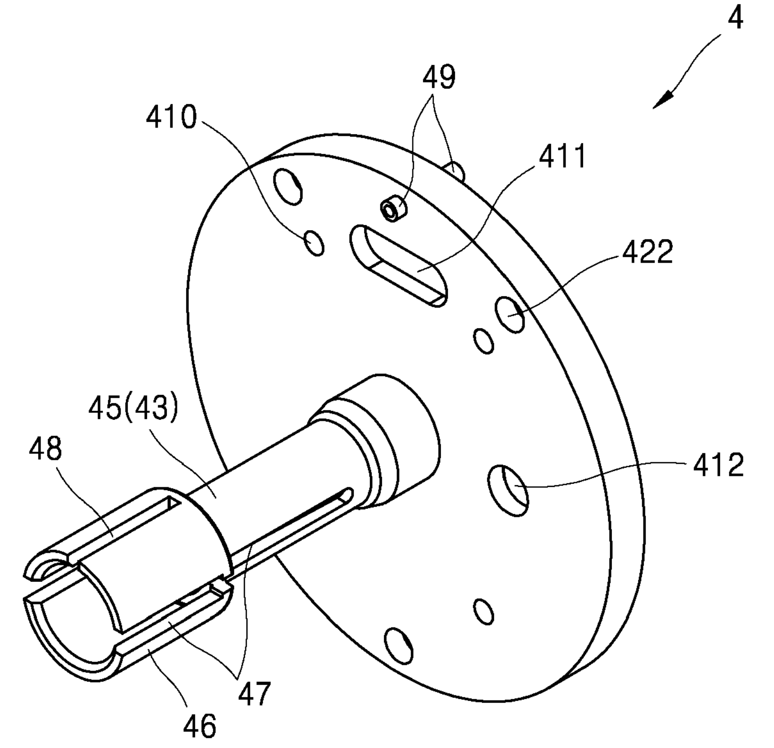
Figure 12:
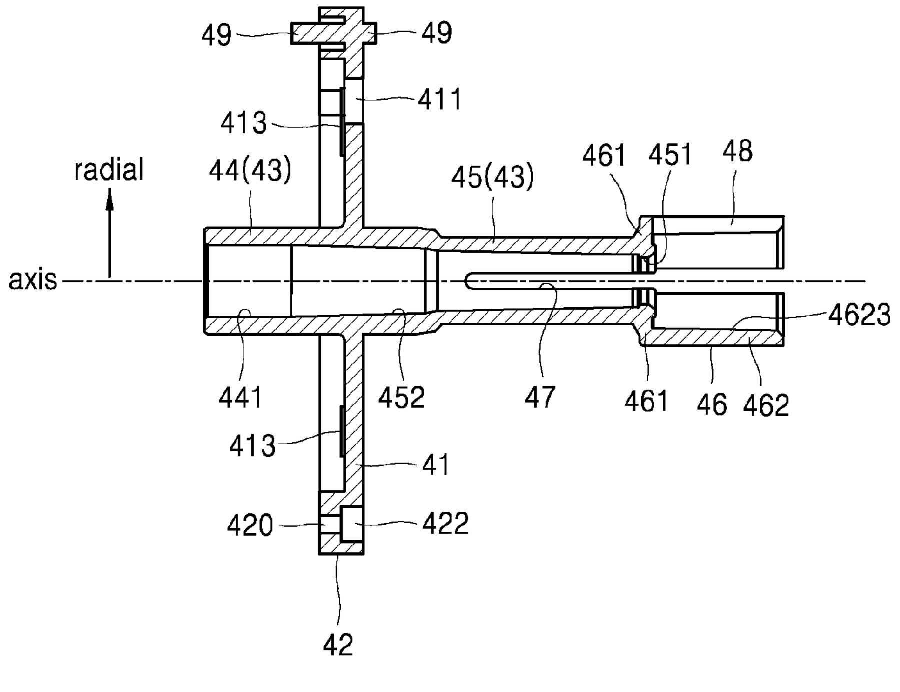

The first end member 75 may be rotatably installed in the cylinder member 70 with respect to two axes (C1, Q1; see FIGS. 8 and 9) perpendicular to the axis direction of the adjustment shaft 9. The two axes C1, Q1 may be perpendicular to each other. The second end member 76 may be rotatably installed in the cylinder member 70 with respect to two axes (C2, Q2; see FIGS. 8 and 9) perpendicular to the axis direction of the adjustment shaft 9. The two axes C2, Q2 may also be perpendicular to each other.

The first end member 75 may engage with the cylinder member 70 in a rotational direction around the adjustment shaft 9. The second end member 76 may also engage with the cylinder member 70 in a rotational direction around the adjustment shaft 9.

A second rotational engagement shape 921, a so-called D cut, may be formed at the front end of the second adjustment shaft 92, and a D hole in which the D cut of the second adjustment shaft 92 is accommodated may be formed at the second end member 76.

A first adjustment shaft 91 may connect to the first end member 75.

A first rotational engagement shape 911, a so-called D cut, may be formed at a rear end of the first adjustment shaft 91, and a D hole in which the D cut of the first adjustment shaft 91 is accommodated may be formed at the first end member 75.

A knob 2 may connect to a front end of the first adjustment shaft 91. The knob 2 may be disposed further forward than the first panel 11. Torque, applied to the first adjustment shaft 91 as a result of a rotation of the knob 2 by a user, may be delivered to the second end member 76 through the cylinder member 70.

The first adjustment shaft 91 and the universal joint 7 may be supported by the support-alignment member 4.

The support-alignment member 4 may be provided with a bracket 40 contacting and fixed to a front surface of the first panel 11 and having a circular plate shape. The bracket 40 may cover the through opening 111 of the first panel 11.

Additionally, the support-alignment member 4 may be provided with a shaft supporting member 43 including a first supporting member 44 extended forward from a central portion of the bracket 40 and a second supporting member 45 extended rearward from the central portion of the bracket 40. The shaft supporting member 43 may pass through the through opening 111.

The first adjustment shaft 91 may pass through the shaft supporting member 43. The shaft supporting member 43 may support a rotation of the first adjustment shaft 91 and support an axis-wise slide of the first adjustment shaft 91.

A joint supporting member 46 may connect to a rear end of the shaft supporting member 43. The joint supporting member 46 may support a rotation of the universal joint 7. Specifically, the joint supporting member 46 may support the first end member 75.

A radial movement of the first end member 75 may be limited by the joint supporting member 46. When viewed in the axis direction, a position of the first end member 75 may be aligned accurately.

An axis-wise slide of the first end member 75 may be limited by the joint supporting member 46. The first end member 75 may be prevented from sliding further forward than a predetermined position P4 by the joint supporting member 46. The first end member 75 may approach the joint supporting member 46 from a rear of the joint supporting member 46 and engage with the joint supporting member 46.

When the first end member 75 is supported by the joint supporting member 46 and is in a fourth position P4 that is a most forward position, and the second adjustment shaft 92 is in the non-press position P2, the first end member 75 maybe spaced a second distance D2 from the second end member 76 in the axis direction. Thus, a distance by which the first end member 75 slides from the fourth position P4 to a most rearward position equals a total D1+D2 of the first distance and the second distance.

As the first end member 75 moves rearward, the first end member 75 may contact the second end member 76. In the embodiment, a spring coefficient of the spring 77 of the universal joint 7 may be less than a spring coefficient of the spring 83 of the valve assembly 80. Accordingly, when the user presses the knob 2 rearward and the first end member 75 moves rearward, the first end member 75 may contacts the second end member 76 before the second adjustment shaft 92 moves the first distance D1.

The bracket 40 may be fixed to the first panel 11 in a state of contacting the front surface of the first panel 11. The bracket 40 may include a first member 41 contacting and fixed to the first panel 11. The first member 41 may be formed into a circular plate extended from the shaft supporting member 43 in the radial direction. A second member 42 may be provided further outward than the first member 41 in the radial direction. The second member 42 may be a portion coupled to a knob ring 6.

The knob ring 6 may be fixed to the second member 42 from a front of the second member 42. An inner circumferential surface 62 of the knob ring 6 may limit a radius-wise movement of the knob 2 to regulate a position of the knob 2. The inner circumferential surface 62 of the knob ring 6 may allow of an axis-wise slide of the knob 26. The inner circumferential surface 62 of the knob ring 6 may guide a slide of the knob 2.

The knob 2 may connect to the front end of the first adjustment shaft 91 from the front of the first adjustment shaft 91. The knob 2 may be fixed to the first adjustment shaft 91, and rotate integrally together with the first adjustment shaft 91 and slide integrally together with the first adjustment shaft 91.

For the first end member 75 to move by a total D1+D2 of the first distance and the second distance from the fourth position P4, the knob 2 may slide by a total D1+D2 of the first distance and the second distance in the axis direction.

When the knob 2 rotates in a state in which the knob 2 is not pressed rearward, the valve may not be adjusted. In the embodiment, a stopper structure that prevents the knob 2 from rotating in the state in which the knob 2 is not pressed may be applied.

The stopper structure may include a first stopper 3 fixed to the first panel 11, and a second stopper 23 disposed on a rear surface of the knob 2 and interfering with the first stopper 3. In a state in which the knob 2 is in a most forward position, the second stopper 23 may be in a sixth position P6. When the second stopper 23 is in the sixth position P6, the second stopper 23 and the first stopper 3 may interfere with each other in the circumferential direction. When the knob 2 slides rearward from the most forward position by a total D1+D2 of the first distance and the second distance, the second stopper 23 and the first stopper 3 may not interfere with each other in the circumferential direction. Thus, the user may adjust the valve 8 by rotating the knob 2 in a state in which the user pushes the knob 2 rearward by a total D1+D2 of the first distance and the second distance.

In the knob assembly, a distance D3 by which the knob 2 can move in the axis direction may be the same as or greater than a total D1+D2 of the first distance and the second distance.

[Universal Joint]

Hereunder, a universal joint 7 according to the disclosure is described with reference to FIGS. 5 to 9.

Figure 5:
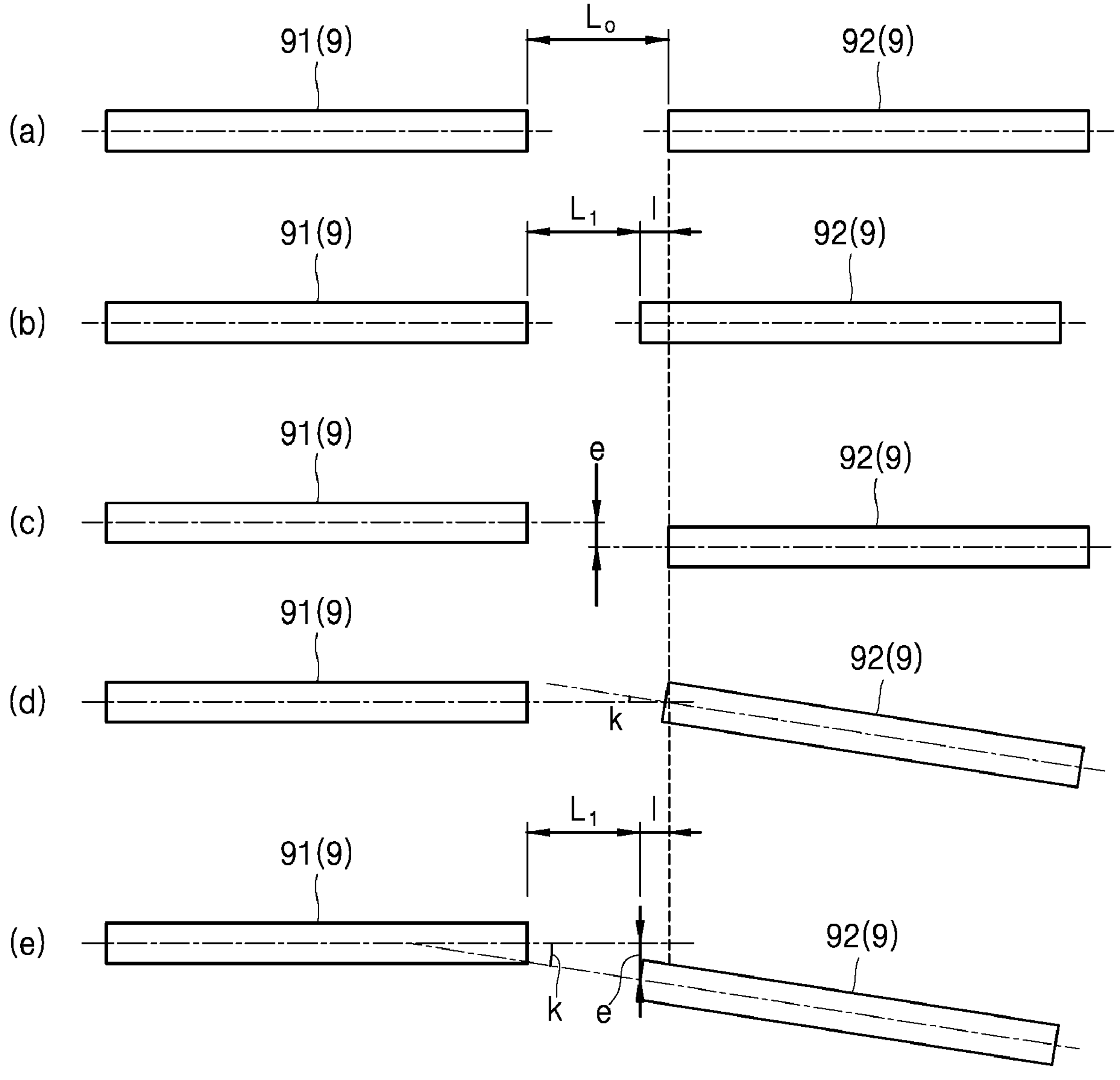
FIG. 5 is a view showing the sorts of errors in the alignment of a first adjustment shaft and a second adjustment shaft, removed/reduced by a universal joint, in the knob assembly according to the present disclosure.
Figure 6:
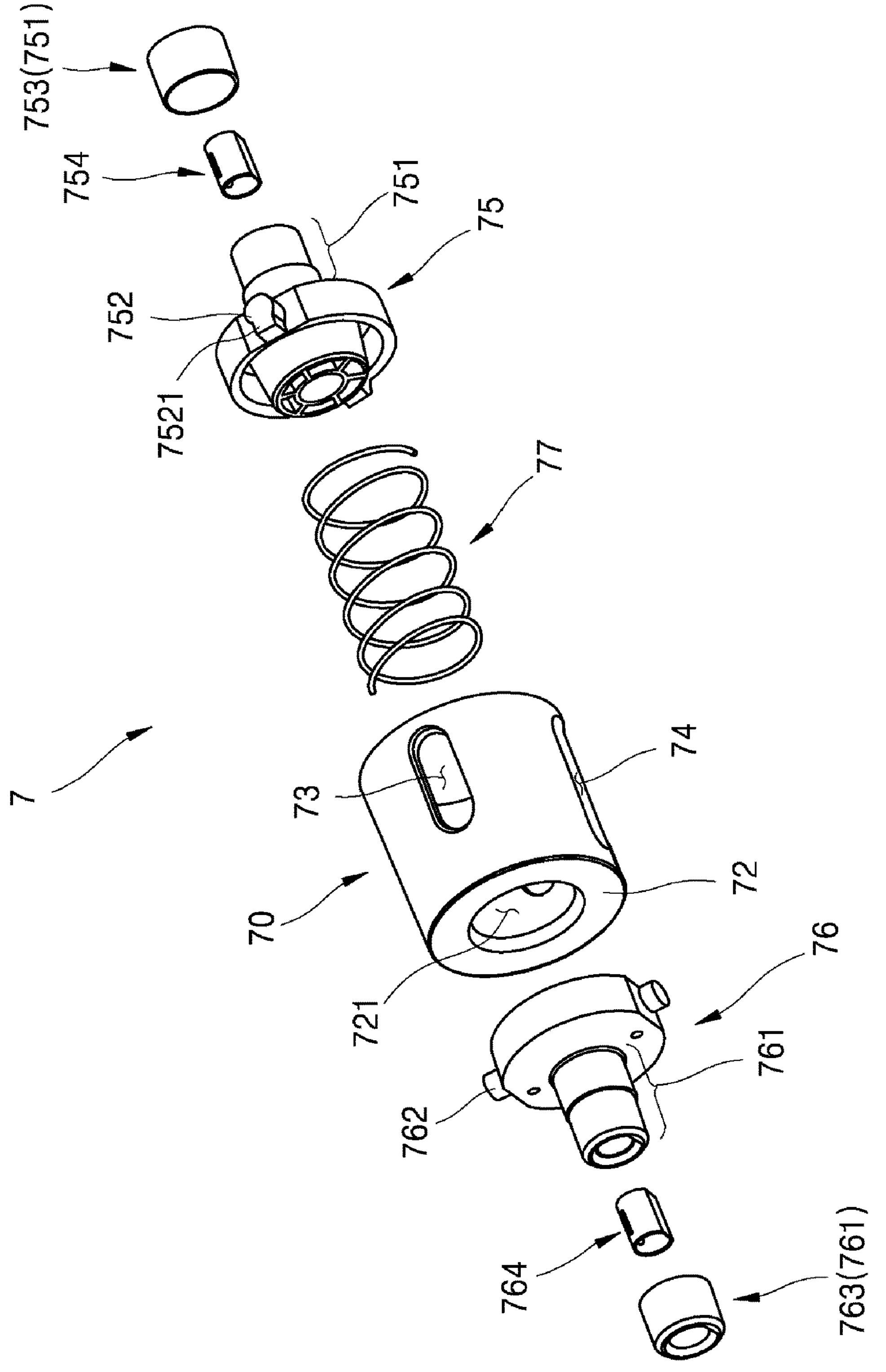
FIG. 6 is an exploded perspective view showing a universal joint.
Figure 7:
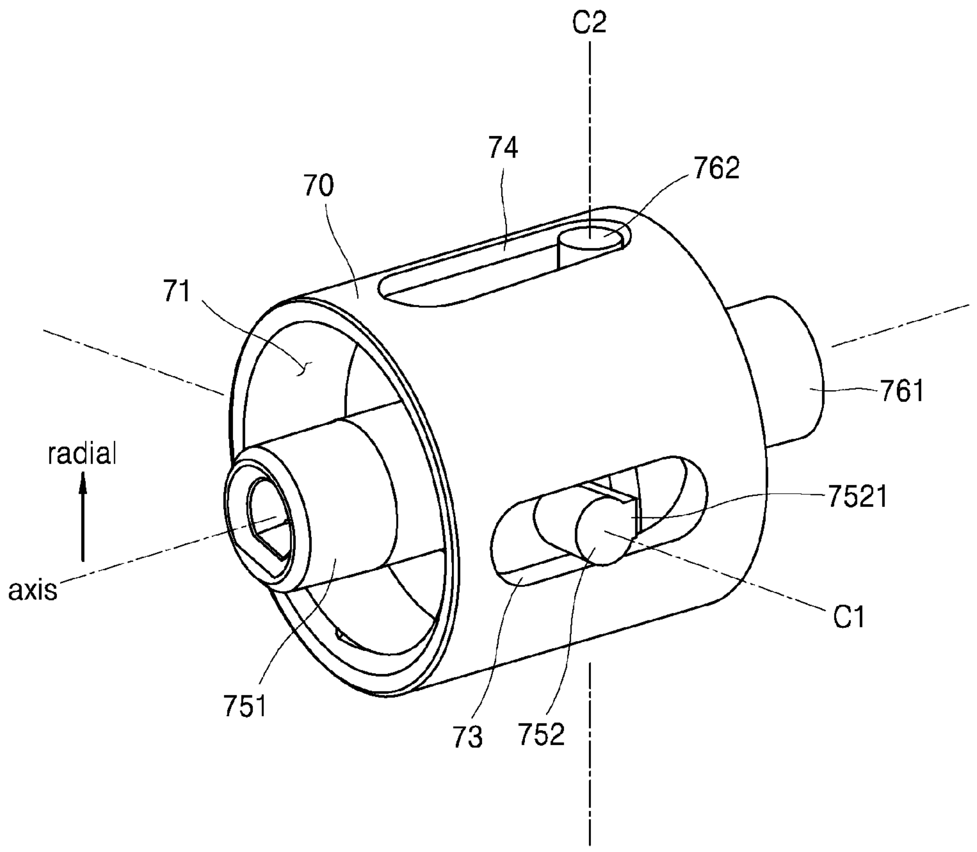
FIG. 7 is a perspective view only showing a universal joint in a state in which the universal joint is installed in a knob assembly.

Referring to FIG. 5, ideally, the first adjustment shaft 91 and the second adjustment shaft 92 are on the same axis and spaced from each other by a reference distance L0, as illustrated in (a) of FIG. 5. However, there is an error in relative positions of the valve assembly 80 and the knob 2. Accordingly, errors in alignment as illustrated in (b), (c), (d) and (e) of FIG. 5 may occur.

In (b) of FIG. 5, the two shafts 91, 92 are spaced a distance L1 from each other due to a distance error 1, for example. In (c) of FIG. 5, shaft centers of the two shafts 91, 92 are offset from each other (eccentric e), for example. In (d) of FIG. 5, the two shafts 91, 92 are not on the same straight line, and one of the two shafts 91, 92 is inclined by a predetermined angle k, for example. In (e) of FIG. 5, the two shafts 91, 92 are spaced a distance L1 from each other due to an error 1, centers of the two shafts 91, 92 are offset from each other (eccentricity e) and are not on the same straight line, and one of the two shafts 91, 92 is inclined by a predetermine angle k, for example.

The universal joint 7 in the embodiment may remove the error and help to smoothly deliver a rotation motion of the first adjustment shaft 91 to the second adjustment shaft 92.

The universal joint 7 may include a cylinder member 70 having a cylinder shape. One side of the cylindrical cylinder member 70 may form an open end 71, and the other side may form a closed end 72. The closed end 72 may have a through hole 721 in a central portion thereof. The cylinder member 70 may have slots 73, 74 formed into a long hole and extended in the axis direction, on a circumferential surface thereof. A pair of first slots 73 may be disposed in positions opposite to each other with respect to an axis. A pair of second slots 74 may be disposed in positions opposite to each other with respect to the axis. A flat plane including the pair of first slots 73, and a flat plane including the pair of second slots 74 may be orthogonal to each other on a central axis of the cylinder member 70. The second slots 74 may be elongated further than the first slots 73 toward the closing end 72.

The second end member 76 may be inserted into the cylinder member 70 through the opening end 71. The second end member 76 may be provided with a main body having an approximate circle shape, a second shaft connecting member 761 extended from a center of the main body in the axis direction, and a pair of second slide shafts 762 extended outward from the main body in the radial direction. The pair of second slide shafts 762 may be fitted into the pair of second slots 74. The second slots 74 may have a width corresponding to a diameter of the second slide shaft 762. The second shaft connecting member 761 may be exposed through the through hole 721 of the closing end 72. Since an inner diameter of the through hole 721 is greater than an outer diameter of the second shaft connecting member 761, a rotation of the second end member 76 about C2 axis or Q2 axis with respect to the cylinder member 70 may be allowed within a predetermined angle.

After the second end member 76 is inserted into the cylinder member 70, a spring 77 in the form of a compression coil spring may be inserted into the cylinder member 70, and the first end member 75 may be inserted into the cylinder member 70, through the opening end 71. The first end member 75 may be provided with a main body having an approximate circle shape, a first shaft connecting member 751 extended from a center of the main body in the axis direction, and a pair of first slide shafts 752 extended outward from the main body in the radial direction. The pair of first slide shafts 752 may be fitted into the pair of first slots 73. The first slots 73 may have a width corresponding to a diameter of the first slide shaft 752. The first shaft connecting member 751 may be exposed through the opening end 71. The first slide shafts 752 may be provided with a rotational angle stopper 7521 protruding from centers of the first slide shafts 752 in the radial direction. The rotational angle stopper 7521 may interfere with inner walls of the first slots 73 to prevent the first end member 75 from rotating out of a predetermined range of angles.

The cylinder member 70, the first end member 75, and the second end member 76 may be made of a synthetic resin using injection molding.

The first shaft connecting member 751 may be provided with a D hole corresponding to the first rotational engagement shape 911 of the first adjustment shaft 91. Since the D hole is a portion that receives torque from the first adjustment shaft 91 made of a metallic material, strength of the D hole needs to improve. To this end, a first reinforcing insert 754 made of a metallic material and formed into a D-shaped cylinder may be insert-molded onto an inner circumferential surface of the D hole. Additionally, a first reinforcing cap 753 made of a metallic material may be insert-molded to the first shaft connecting member 751. The first reinforcing cap 753 may be configured to cover a front end portion of the first shaft connecting member 751 only instead entirely covering the first shaft connecting member 751 entirely in a length-wise direction. The reinforcing structure described above may also be applied to a second reinforcing cap 763 and a second reinforcing insert 764 for the second shaft connecting member 761 using insert-injection molding.

The first end member 75 and the second end member 76 may be elastically supported by the spring 77 in a direction in which the end members 75, 76 become far away from each other, and may be respectively disposed at one end of the first slot 73 and at the other end of the second slot 74 such that the first end member 75 becomes farthest from the second end member 76. Additionally, the first end member 75 and the second end member 76 may become close to each other such that the end members 75, 76 interfere with each other. Thus, the error (I; see (a), (b) and (e) of FIG. 5) in the distance between the first adjustment shaft 91 and the second adjustment shaft 92 may be removed by the universal joint 7.

The first end member 75 may make a relative rotation around a central axis C1 of the pair of first slide shafts 752 with respect to the cylinder member 70.

Additionally, for the first end member 75, the pair of first slide shafts 752 may slide by a different distance (M1; see FIG. 9) with respect to the first slot 73. Accordingly, the first end member 75 may rotate around an axis (Q1; see FIG. 8) perpendicular to both an axis of the cylinder member 70 of the universal joint 7 and the axis C1 of the first slide shaft 752.

Likewise, the second end member 76 may make a relative rotation around a central axis C2 of the pair of second slide shafts 762 with respect to the cylinder member 70.

Additionally, for the second end member 76, the pair of second slide shafts 762 may slide by a different distance (M2; see FIG. 8) with respect to the second slot 74. Accordingly, the second end member 76 may rotate around an axis (Q2; see FIG. 9) perpendicular to both the axis of the cylinder member 70 of the universal joint 7 and the axis C2 of the second slide shaft 762.

Thus, the universal joint 7 may remove the error (e; see (a), (c) and (e) of FIG. 5) in the alignment of the centers of the first adjustment shaft 91 and the second adjustment shaft 92 and the error (e; (a), (d) and (e) of FIG. 5) in the alignment of the angles of the first adjustment shaft 91 and the second adjustment shaft 92.

[Knob—First Adjustment Shaft]

Referring to FIGS. 1 to 4, the knob 2 may be provided with a knob member 20. The knob member 20 may be provided with a handle 21 protruding forward, and have an outer circumferential surface 22 having a cylinder shape. The first adjustment shaft 91 may connect to a central portion of a rear surface of the knob member 20. The knob member 20 may be made of a synthetic resin or a metallic material, and the first adjustment shaft 91 may be made of a metallic material. The rear surface of the knob member 20 may be depressed forward, and the second stopper 23 may be disposed in a space formed by the forward depression. The first stopper 3 fixed to the first panel 11 and protruding forward may also be accommodated in the space formed at a rear of the knob member 20 and not exposed to the outside.

The knob member 20 and the first adjustment shaft 91 may be integrally fixed not to separate from each other, and the first adjustment shaft 91 and the universal joint 7 may be fixed in a separable manner. Then at a time of assembly of the knob 2, the first adjustment shaft 91 may be inserted into the shaft supporting member 43 of the support-alignment member 4 from a space in front of the first panel 11 to connect the first adjustment shaft 91 and the universal joint 7. In this case, the first adjustment shaft 91 may be press-fitted to the first end member 75 of the universal joint 7. When the knob 2 is strongly pulled forward for a separation of the knob 2, the joint supporting member 46 of the support-alignment member 4 may limit a forward movement of the universal joint. Accordingly, the first adjustment shaft 91 may separate from the first end member 75.

Certainly, the knob member 20 and the first adjustment shaft 91 may be press-fitted, and the first adjustment shaft 91 and the universal joint 7 may be integrally connected. Then the knob member 20 may be fitted into the front end of the first adjustment shaft 91 protruding forward through the shaft supporting member 43 of the support-alignment member 4, for the assembly of the knob 2. When the knob 2 is strongly pulled forward for the separation of the knob 2, the knob member 20 may separate from the first adjustment shaft 91 since the joint supporting member 46 of the support-alignment member 4 may limit a forward movement of the universal joint.

The first adjustment shaft 91 connected to the knob member 20 may consecutively include an inserting portion 915 coupled to the knob member 20, a large diameter portion 912 having a diameter greater than a diameter of the inserting portion 915, an inclined portion 914 having a diameter decreased from the large diameter portion 912 to a rear, a small diameter portion 913 connected to the inclined portion 914 and having a diameter less than the diameter of the large diameter portion 912, and a first rotational engagement shape 911 formed in a way that a portion of the small diameter portion 913 is cut into a D shape.

[Support-Alignment Member—Knob Ring]

Hereunder, a support-alignment member is described with reference to FIGS. 9 to 13, and FIGS. 1 to 4.

The support-alignment member 4 may align and support the first adjustment shaft 91. The support-alignment member 4 may be manufactured by injection-molding a synthetic resin. A synthetic resin may be a material appropriate for a leaf spring structure described below.

The support-alignment member 4 may include a bracket 40 that covers the through opening 111 of the first panel 11. The bracket 40 may be formed into an approximately circular flat plate. The bracket 40 may be provided with a temporary fixation boss 49 extended rearward. The temporary fixation boss 49 may be disposed in-ift a center upper portion of the bracket 40. Additionally, a temporary alignment hole 112 of the first panel 11 may be disposed further upward than the trough opening 111. When the temporary fixation boss 49 is fitted into the temporary alignment hole 112 of the first panel 11 during a process in which the support-alignment member 4 is fixed to the first panel 11, the support-alignment member 4 may be hung from the temporary alignment hole 112, and a temporarily fixed position of the support-alignment member 4 with respect to the through opening 111 may be relatively accurately aligned by self-weight of the support-alignment member 4.

The bracket 40 may be provided with a shaft supporting member 43 extended in a front-rear direction, at a center thereof. The shaft supporting member 43 may be provided with a first member 41 that covers the through opening 111 and contacts a portion of the first panel 11 around the through opening 111, outside the shaft supporting member 43 in the radial direction. The first member 41 may have a rear surface that is flat. The first panel 11 may have a front surface that is flat. Accordingly, in the state in which the support-alignment member 4 is hung from the temporary alignment hole 112, the support-alignment member 4 may freely rotate around the temporary fixation boss 49. Thus, the temporarily fixed position of the support-alignment member 4 may be relatively accurately determined using the self-weight of the support-alignment member 4.

A first mounting hole 410 may be disposed at a radial outer edge of the first member 41. The first mounting hole 410 may have a diameter small enough to allow a screw thread portion of a screw S to pass and prevent a head of the screw from passing. Accordingly, in a state in which the first mounting hole 410 and the first threaded hole 113 of the first panel 113 are aligned, the screw S may pass through the first mounting hole 410 from a position further forward than the first panel 11 and screw-coupled to the first threaded hole 113. Four first mounting holes 410 may be provided, and disposed in a position that is an upper portion of the shaft supporting member 43 and laterally outside the shaft supporting member 43, and disposed in a position that is a lower portion of the shaft supporting member 43 and laterally outside the shaft supporting member 43. In the position, the first mounting hole 410 may not be covered by the shaft supporting member 43 and easily seen by a worker such that the support-alignment member 4 is easily attached to and detached from the first panel 11.

The first member 41 may be provided with an opening 411. The opening 411 may be disposed further upward than the shaft supporting member 43 and further downward than the temporary fixation boss 49, and easily seen by the worker. The second threaded hole 114 of the first panel 11 may be exposed through the opening 411. Thus, the worker may easily fasten the first stopper 3 with the screw S to the second threaded hole 114 through the opening 411 in a space in front of the first panel 11.

The first member 41 may have a service hole 412. The service hole 412 may be disposed on one side of the first member 41. The service hole 412 may face the through opening 111. Accordingly, the worker may approach the valve assembly 80 through the service hole 412 for maintenance of the valve.

A second member 42 may be provided at radial outer portion of the first member 41. The second member 42 may be thicker than the first member 41 to ensure rigidity of the bracket 40. A rear surface of the second member 42 may be formed in a way that the rear surface of the first member 41 extends in the radial direction. That is, the rear surface of the first member 41 and the rear surface of the second member 42 may constitute of the same flat surface. A front surface of the second member 42 may protrude further forward than a front surface of the first member 41. A thick rib structure 413, protruding further than the front surface of the first member 41, may be applied around a portion of the first member 410, in which the first mounting hole 410 is formed, to improve rigidity. The rib 413 may connect up to the second member 42.

A knob ring 6 having a ring shape may be coupled to a front of the second member 42. The knob ring 6 may be made of a synthetic resin or a metallic material. The temporary fixation boss 49 may be disposed at the second member 42 and protrude from the second member 42 forward and rearward. The knob ring 6 may have a groove 631 into which the temporary fixation boss 49 is inserted, on a rear surface thereof. The temporary fixation boss 49 and the groove 631 may align the second member 42 and the knob ring 6.

The second member 42 may be provided with a second mounting hole 420 along a circumference direction thereof. Only three second mounting holes 420 may be provided to fix the knob ring 6 while four first mounting holes 410 are provided to fix the support-alignment member 4 to the first panel 11 strongly. Once the second member 42 and the knob ring 6 are fixed to each other, the second member 42 and the knob ring 6 may remain fixed to each other even during assembly or maintenance. Additionally, the second member 42 and the knob ring 6 may be fixed to each other before the support-alignment member 4 is fixed to the first panel 11. Accordingly, the shaft supporting member 43 may not be in sight of the worker during the fixation of the second member 42 and the knob ring 6. As a result, the second mounting hole 420 may be disposed in the lower portion of the shaft supporting member 43, and in both upper lateral portions of the shaft supporting member 43 which avoid the temporary fixation boss 49.

A recess 422 in which a head of a screw S is accommodated may be disposed further rearward than the second mounting hole 420. A threaded groove 632 may be formed in a position of the rear surface of the knob ring 6, corresponding to a position of the second mounting hole 420. When the screw S passes through the second mounting hole 420 from a space at a rear of the second member 42 and is screw-coupled to the threaded groove 632 of the knob ring 6, the head of the screw may be hidden in the recess 422 and may not protrude further rearward than the rear surface of the second member 42. Accordingly, the rear surface of the first member 41 and the rear surface of the second member 42 may closely contact the front surface of the first panel 11.

A rear surface 63 of the knob ring 6 may contact the front surface of the second member 42. An outer circumferential surface of the knob ring 6 may surround an outer circumferential surface of the second member 42 to prevent the second member 42 from be exposed to the outside. The front surface 6 and the outer circumferential surface of the knob ring 6 may be coated to provide aesthetic qualities to the exterior.

An inner circumferential surface 62 of the knob ring 6 may have the same shape as a bore of the cylinder and face the outer circumferential surface 22 of the knob member 20 in a way that the inner circumferential surface 62 of the knob ring 6 is spaced a little distance from the outer circumferential surface 22 of the knob member 20. The inner circumferential surface 62 of the knob ring 6 may guide a front-rear movement of the knob member 20 and minimize the possibility of a scratch on the outer circumferential surface 22 of the knob member 20.

In a state in which the knob ring 6 is fixed to the second member 42, the first mounting hole 410, the opening 411 and the service hole 412 of the first member 41 may be exposed outward. When the knob 2 is installed, the first member 41 may be hidden and not be exposed outward.

The shaft supporting member 43, disposed at the center of the support-alignment member 4, may extend in the front-rear direction. The shaft supporting member 43 may include a first supporting member 44 extended forward from the first member 41, and a second supporting member 45 extended rearward from the first member 41. The second supporting member 44 and the second supporting member 45 may connect smoothly. The first supporting member 44 may be provided with a first supporting surface 441 at a front end of an inner circumferential surface thereof, and the first supporting surface 441 may correspond to the large diameter portion 912 of the first adjustment shaft 91 and have an inner diameter slightly greater than a diameter of the large diameter portion. The first supporting surface 441 may extend rearward to a position in which the larger diameter portion 912 is placed, at least during a front-rear slide of the first adjustment shaft 91.

The second supporting member 45 may be provided with a second supporting surface 451 at a rear end thereof, and the second supporting surface 451 may correspond to the small diameter portion 913 of the first adjustment shaft 91 and have an inner diameter slightly less than the small diameter portion. An axis-wise range of the small diameter portion 913 of the first adjustment shaft 91 may be a range or greater in which the first adjustment shaft 91 contacts the second supporting surface 451 when sliding in the front-rear direction.

The front-rear range of the second supporting surface 451 may be less than the front-rear range of the first supporting surface 441. The second supporting member 45 and the joint supporting member 46 may be provided with a first slit 47 that is cut rearward from a predetermined position of the second supporting member 45 to an end of the joint supporting member 46. In the embodiment, a pair of first slits 47 is formed on both sides with respect to an axial center in a horizontal direction, for example. The first slits 47 may allow the second supporting member 45 to serve as a sort of leaf spring. When the small diameter portion 913 of the first adjustment shaft 91 is inserted into the second supporting surface 451, the second supporting member 45 may be elastically deformed by the first slits 47 in a direction in which a diameter of the second supporting surface 451 increases. An elastic restoring force of the second supporting member 45 may act as a force of aligning the first adjustment shaft 91 in a reference position accurately.

According to the present disclosure, the shaft supporting member 43 may be integrally formed and extended forward toward the knob and extended rearward toward the joint supporting member 46 to have a sufficient length, and may be provided with the first supporting surface 441 and the second supporting surface 451, at both ends thereof, to support the first adjustment shaft 91 in two remote areas. Accordingly, the first adjustment shaft 91 may be precisely aligned with respect to the support-alignment member 4.

A tapered sector 452 may be provided between the first supporting surface 441 and the second supporting surface 451, and have an inner diameter that decreases from the first supporting surface toward the second supporting surface. The tapered sector 452 may help to ensure a thickness of the shaft supporting member 43 and allow the shaft supporting member 43 to play a sufficient role of a leaf spring. Additionally, the tapered sector 452 may guide the first adjustment shaft 91 such that the first adjustment shaft 91 is smoothly fitted into the shaft supporting member 43. The first adjustment shaft 91 may be provided with an inclined portion 914 having a diameter that decreases in a section from the large diameter portion 912 to the small diameter portion 913. Accordingly, the first adjustment shaft 91 may be fitted into the shaft supporting member 43 more smoothly.

The joint supporting member 46 may integrally connect to the rear end of the shaft supporting member 4. The shaft supporting member 46 may be provided with a flange 461 extended outward from the rear end of the shaft supporting member 43 in the radial direction, and a cylinder 462 extended rearward from an a radial outer end of the flange 461.

Figure 13:
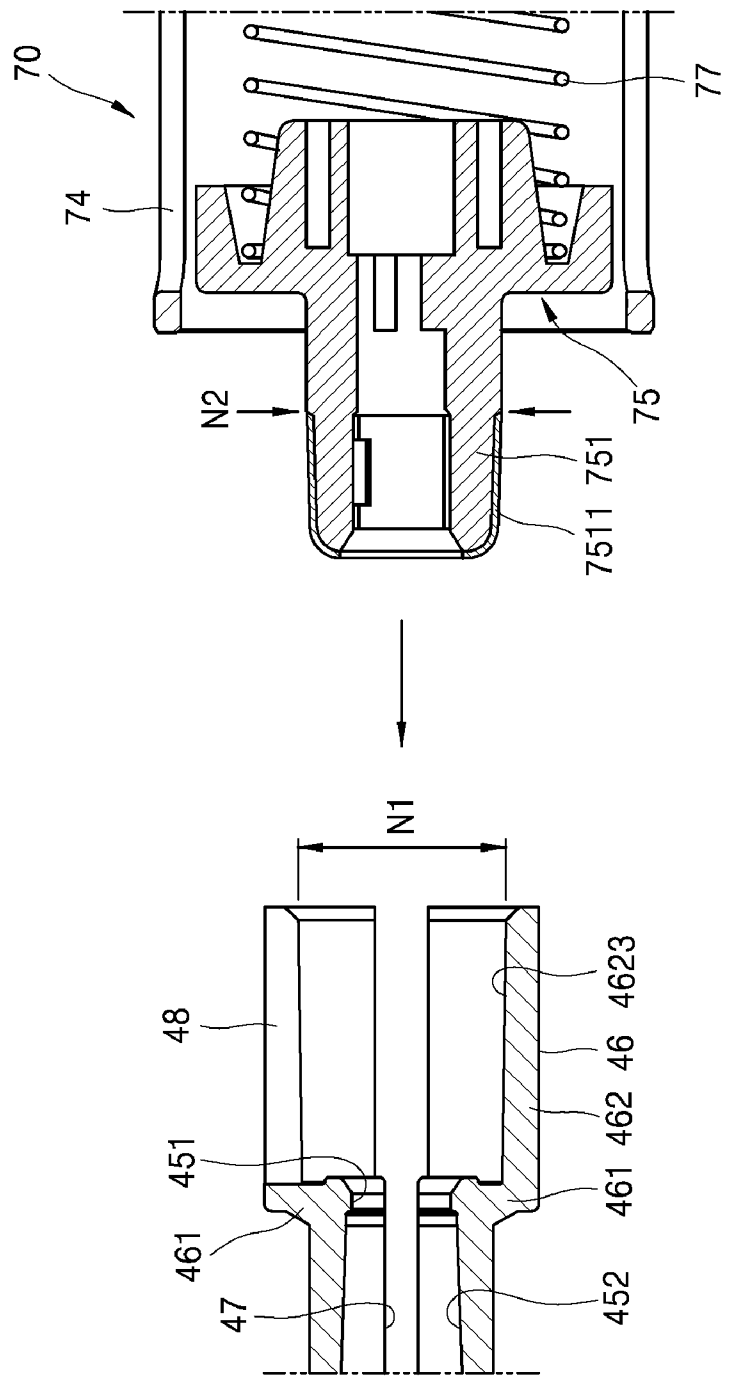
FIG. 13 is an enlarged cross-sectional view showing a joint supporting member and a first end member.

The cylinder 462 may have an inner diameter corresponding to an outer diameter of the first shaft connecting member 751 of the universal joint 7. Referring to FIG. 13, the cylinder 462 may be provided with an accommodating tapered surface 4623 having an inner diameter that increases toward a rear of the accommodating tapered surface 4623 gradually and minutely. A first reinforcing cap 753 of the first shaft connecting member 751 may be provided with an inserting tapered surface 7511 having an outer diameter that decreases gradually toward the front end portion described above. A rear end of the accommodating tapered surface 4623 may have a maximum diameter N1, and a rear end of the inserting tapered surface 7511 may have a maximum diameter N2. The maximum diameter N1 may be slightly greater than the maximum diameter N2, that is, the maximum diameter N1 may be 0.2 mm greater than the maximum diameter N2. Accordingly, the first shaft connecting member 751 of the universal joint 7 may be inserted into the joint supporting member 46 more smoothly. After the first shaft connecting member 751 is inserted into the joint supporting member 46, an outer circumferential surface of the first shaft connecting member 751 may contact an inner circumferential surface of the cylinder 462.

The structures of the first reinforcing cap 753 and the inserting tapered surface 7511 may also be applied to the second shaft connecting member 761. That is, a second reinforcing cap 763 may be provided with an inserting surface having a diameter that decreases toward an end of the second reinforcing cap 763. Then the second end member 76 of the universal joint 7 may be arranged at the front and coupled to the first adjustment shaft, and the universal joint 7 may be installed such that the first end member 75 may be arranged at the rear and coupled to the second adjustment shaft.

Alternatively, directionality may be given to the universal joint such that the first adjustment shaft is coupled with the first end member while the second adjustment shaft is coupled with the second end member. When the first adjustment shaft and the second adjustment shaft have a different diameter or the first rotational engagement shape 911 and the second rotational engagement shape 912 have a different shape or size, for example, directionality may be given to the universal joint.

A second slit 48 may be formed in a position of the cylinder 462 of the joint supporting member 46, which is different from the position of the first slit 47. The second slit 48 may be cut along the axis direction. The second slit 48 may be formed only at the joint supporting member 46 and cut rearward, and not extended to the shaft supporting member 43. For example, the second slit 48 may be formed at an upper end of the cylinder 462. Though not illustrated, the second slit 48 may be further formed at a lower end of the cylinder 462.

The joint supporting member 46 itself may serve as another leaf spring structure with the help of the second slit 48. In the leaf spring structure implemented by the first slit 47, the second supporting surface 451 may provide elasticity for supporting and aligning the first adjustment shaft 91. Unlike the first slit, the second slit 48 may provide a leaf spring structure implemented by the joint supporting member 46 independent from the second supporting member 45. Accordingly, when the first shaft connecting member 751 of the first end member 75 of the universal joint 7 is accommodated in the bore shape of the cylinder 462 of the joint supporting member 46, the cylinder 462 portion may be elastically deformed and split open by the second slit 48. The second slit 48's being split open may not affect the shaft supporting member 43. Accordingly, even if the cylinder 462 is deformed by the first shaft connecting member 751, the misalignment of the first adjustment shaft 91 caused by the split of the second supporting surface 451 may be minimized.

The first shaft connecting member 751 may be supported by elasticity of the joint supporting member 46 having an independent leaf spring structure with the help of the second slit 48. Since the first shaft connecting member 751 is provided with the inserting tapered surface 7511, in a front end portion thereof, and the cylinder 462 is provided with the accommodating tapered surface 4623, the first shaft connecting member 751 may be aligned accurately as the first shaft connecting member 751 is inserted further into the cylinder 462 while moving forward.

Figure 2:
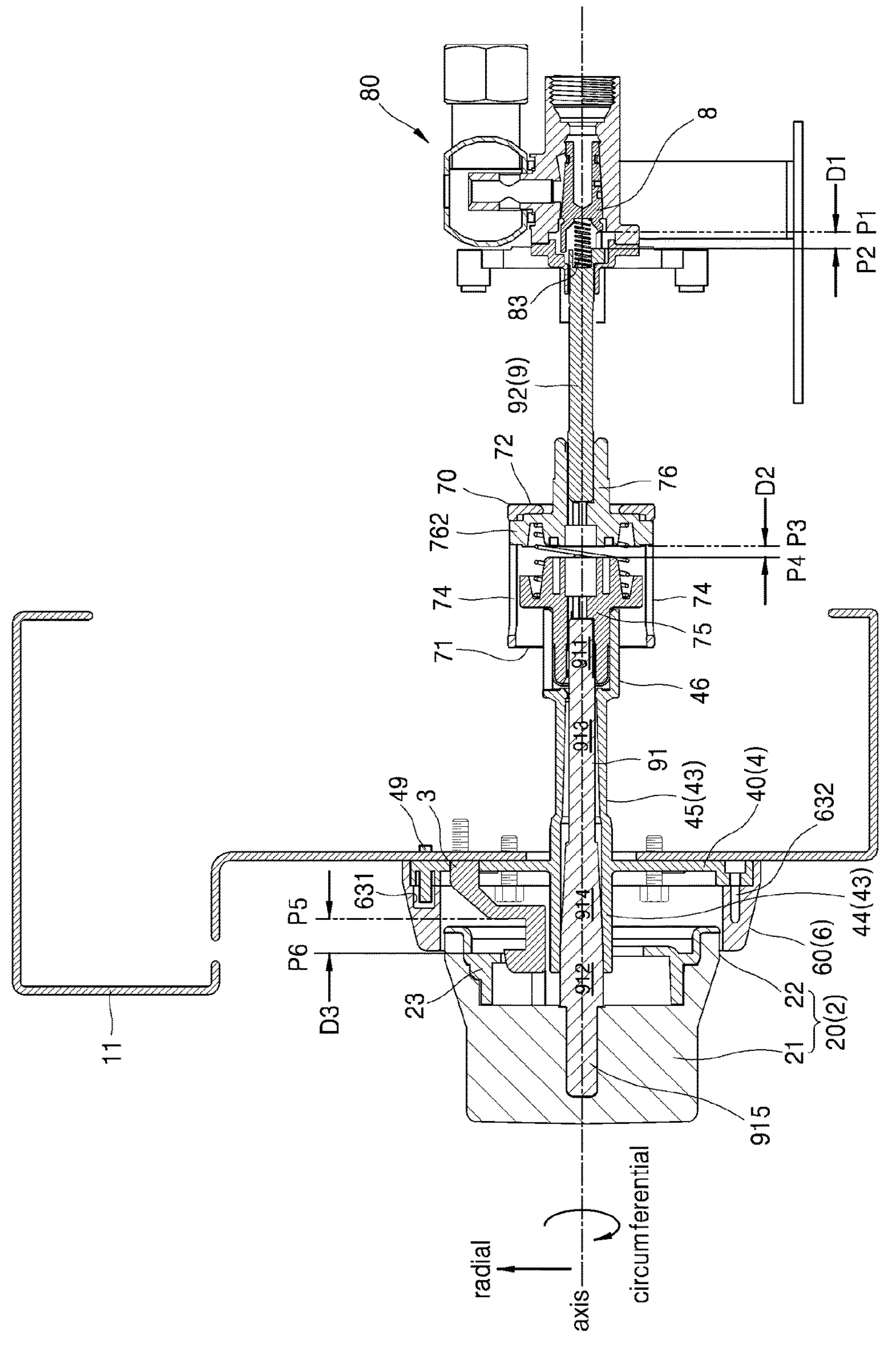
FIG. 2 is a cross-sectional view of FIG. 1.
Figure 3:
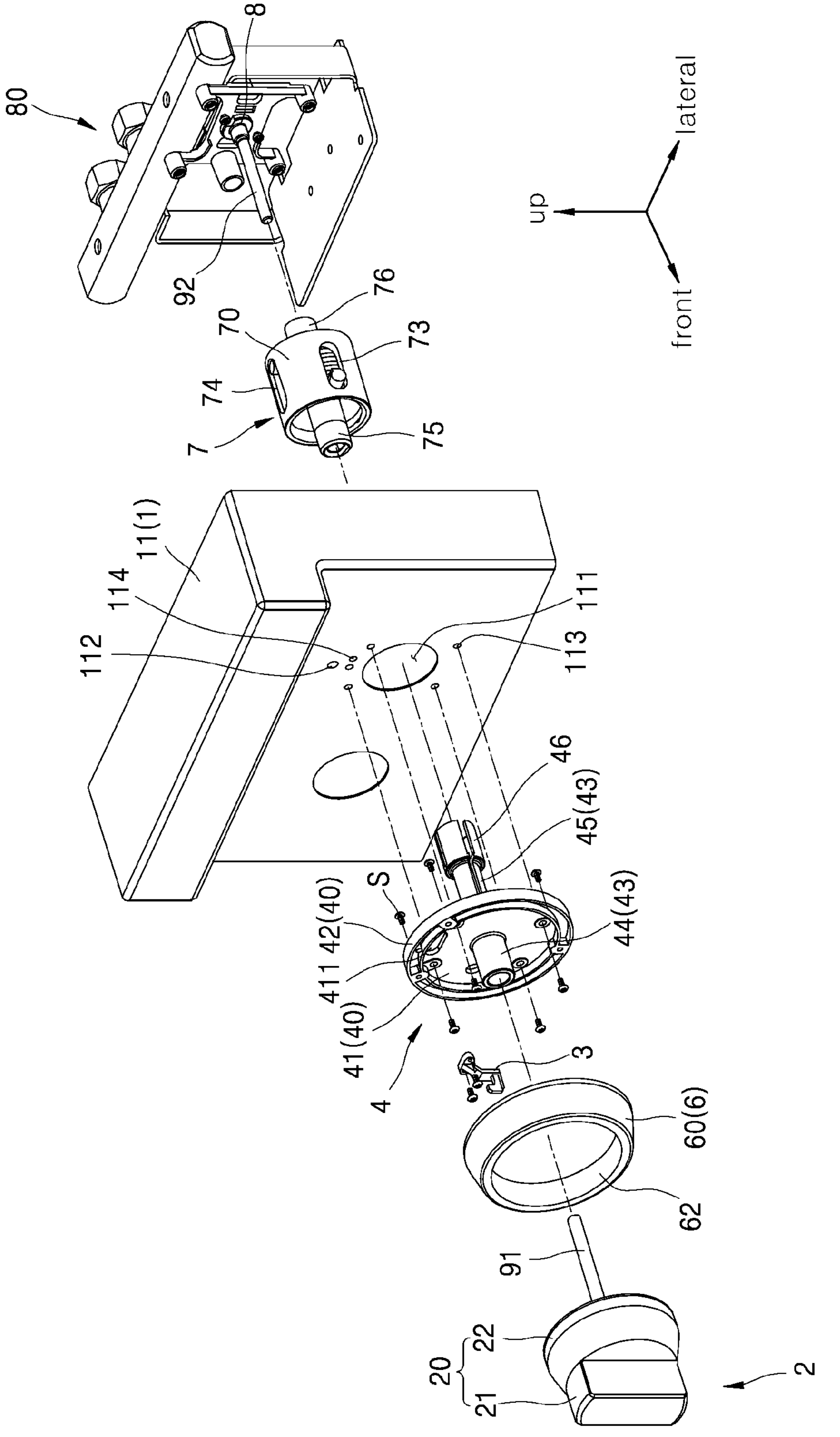
FIG. 3 is an exploded perspective view showing the knob assembly in FIG. 1, when viewed from a front.
Figure 4:
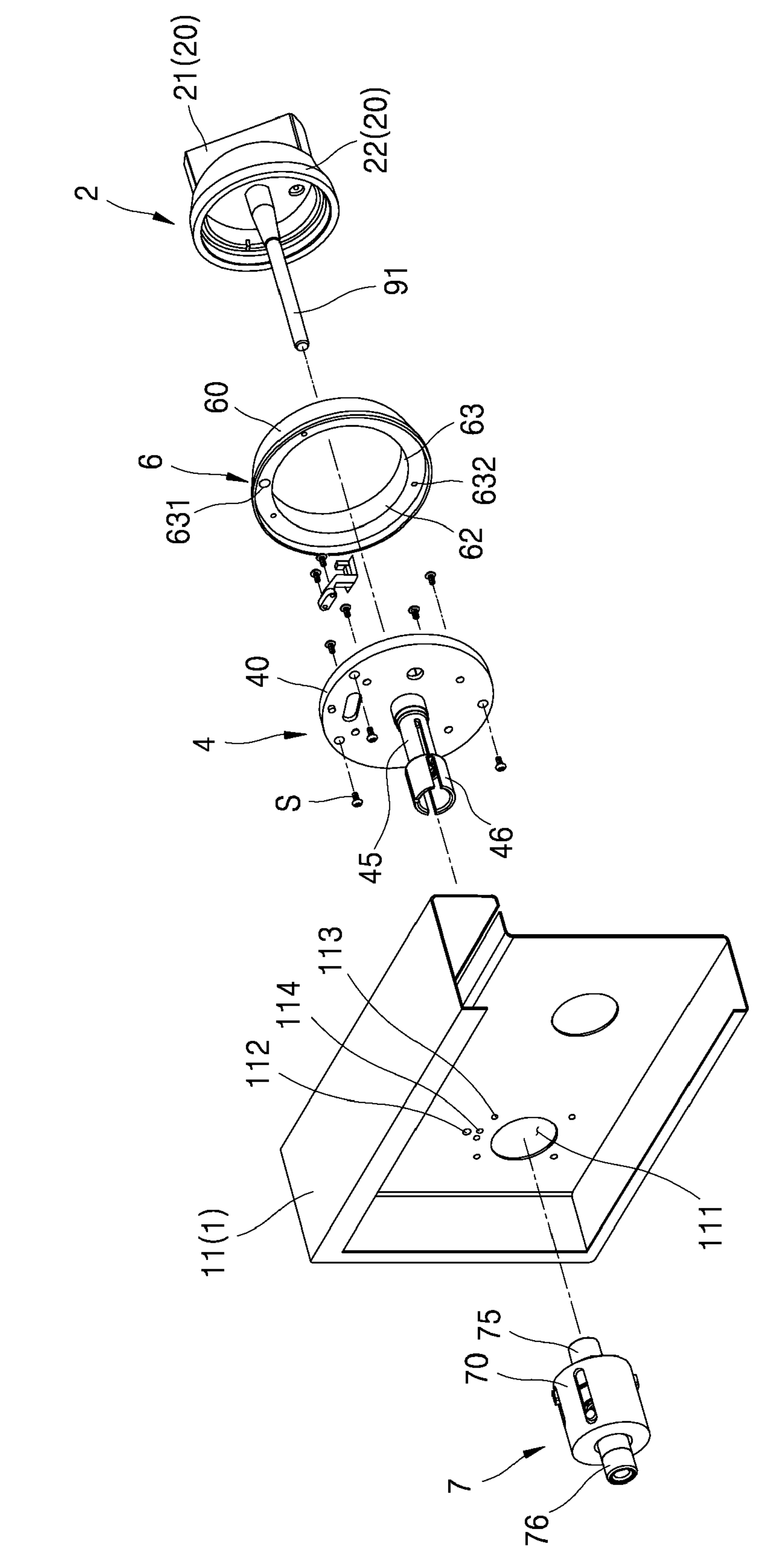
FIG. 4 is an exploded perspective view showing the knob assembly in FIG. 3 without a valve assembly, when viewed from a rear.

The cylinder 462 may have a length greater than a length of the first shaft connecting member 751. The first shaft connecting member 751 may be inserted until the first end member 75 contacts the end of the cylinder 462, as illustrated in FIG. 2.

Alternatively, the cylinder 462 may have a length less than the length of the first shaft connecting member 751, and the first shaft connecting member 751 may be inserted until the front end portion of the first shaft connecting member 751 contacts the flange 461.

[Assembly of Knob Assembly]

Hereunder, a process of assembling a knob assembly is described with reference to FIGS. 1 to 4. A first panel 11 may be disposed at a front of a second panel 12, a valve assembly 80 may be fixed and disposed onto the second panel 12, and a second adjustment shaft 92 may be fitted into the valve assembly 80. The second adjustment shaft 92 may be provided in a state of being fitted into the valve assembly 80 or provided additionally.

Additionally, a second end member 75 of a universal joint 7 may be fitted into a front end of the second adjustment shaft 92. But for non-directional universal joint, a first end member 74 would be fitted into the front end of the second adjustment shaft 92.

A knob ring 6 may be provided in a state of being fastened to a support-alignment member 4, i.e., a bracket 40.

Then the first end member 74 of the universal joint 7 may be fitted into a joint supporting member 46 provided at an end of a rear of a second supporting member 45 while the second supporting member 45 is inserted from a space in front of the first panel 11 through a through opening 111 of the first panel 11. For non-directional universal joint, the second end member 75 would be fitted into the joint supporting member 46.

Additionally, a temporary fixation boss 49 provided on a rear surface of a second member 42 of the bracket 40 may be fitted into a temporary alignment hole 112 of the first panel 11. Then in a state in which a first mounting hole 410 of a first member 41 of the bracket 40 is aligned with a first threaded hole 113 of the first panel 11, the bracket 40 may be fixed to the first panel 11 using a screw S. Thus, the universal joint 7 may be aligned and supported by the joint supporting member 46.

Then a first stopper 3 may be fixed to a second threaded hole 114 of the first panel 11, exposed through an opening 411 of the first member 41.

A knob 2 may be provided in a state of being assembled to a first adjustment shaft 91.

Then when the first adjustment shaft 91 is inserted through a first supporting member 44 and a first rotational engagement shape 911 of the first adjustment shaft 91 is press-fitted into a first shaft connecting member 751 of the universal joint, the knob assembly may be completely assembled. When the first adjustment shaft 91 is press-fitted, the first end member 75 may be pushed rearward. As the first end member 75 contacts the second end member 76, the first end member 75 and the second end member 76 may be pushed together rearward. When the first end member 75 moves by a total D1+D2 of a first distance D1 and a second distance D2, the first end member 75 may not be pushed rearward any longer. Thus, when the first adjustment shaft 91 is pressed further rearward, the first adjustment shaft 91 may be press-fitted into the first shaft connecting member 751.

[Maintenance and Repairs of Knob Assembly]

The knob assembly structure according to the present disclosure may ensure ease of management and repairs, as described hereunder. The valve assembly 80 and the second adjustment shaft 92 may be made of a metallic material and ensure high durability. The universal joint 7 may be relatively weak since the universal joint 7 is made of a synthetic resin and continues to deliver torsion. The support-alignment member 4 may also be relatively weak since the support-alignment member 4 is made of a synthetic resin and supports movements of the first adjustment shaft 91 and the universal joint 7.

For the maintenance of the support-alignment member 4 and/or the universal joint 7, the knob 2 may be pulled forward such that the knob 2 and the first adjustment shaft 91 separate from the knob assembly. Since the universal joint 7 is prevented from moving further forward than a predetermined position by the joint supporting member 46, the press-fitted first adjustment shaft 91 may separate from the first shaft connecting member 751. As a result of the separation of the knob 2 and the first adjustment shaft 91, the first member 41 and the first stopper 3 are exposed. Then the screw S may be unscrewed such that the first stopper 3 and the support-alignment member 4 separate from the first panel 11. Thus, the support-alignment member 4 may be readily repaired.

A worker may approach the universal joint 7 through the through opening 111 of the first panel 11, exposed as a result of the separation of the support-alignment member 4. Additionally, when the through opening 111 has a size greater than a size of the universal joint 7, the universal joint 7 may be taken out to the front of the first panel 11 through the through opening 111. Thus, the universal joint 7 may also be readily managed and repaired.

In the embodiment, the knob assembly may be readily managed and repaired in a space at the front of the cooking appliance without disassembling the housing 1 including the first panel 11 and the second panel 12.

The embodiments are provided only as an example, and the scope of the present disclosure can be defined according to the appended claims rather than the above description. Further, it is to be understood that all modifications and changes drawn from the meaning and scope of the claims and equivalents thereof are included in the scope of the technical spirit of the disclosure.

The embodiments are described above with reference to a number of illustrative embodiments thereof. However, the present disclosure is not intended to limit the embodiments and drawings set forth herein, and numerous other modifications and embodiments can be devised by one skilled in the art without departing from the technical spirit of the disclosure. Further, the effects and predictable effects based on the configurations in the disclosure are to be included within the range of the disclosure though not explicitly described in the description of the embodiments.

The invention claimed is:

1. A home appliance, comprising:
- a panel having a through hole;
- a support-align member that includes a bracket, a shaft support coupled to the bracket, and a joint support coupled to the shaft support;
  - the bracket is disposed outside of the panel, configured to cover the through hole, and fixed to a front surface of the panel,
  - the shaft support is provided on the bracket, extending in a frontward-rearward direction, and formed in the shape of a tube, and
  - the joint support contacts a rear end of the shaft support of the support-align member;
- a knob disposed outside of the panel at a front of the through hole and the bracket;
- a knob ring connected to the bracket and surrounding a circumference of the knob;
- a universal joint rotatably supported by the joint support disposed at the rear end of the shaft support;
- a valve assembly disposed at a rear of the universal joint;
- a first adjustment shaft inserted into the shaft support, rotatably supported by the shaft support and supported by the shaft support in such a way that the first adjustment shaft slides in an axial direction, having a front end connected to the knob and a rear end connected to a first end of the universal joint, and configured to rotate together with the knob and the universal joint; and
- a second adjustment shaft having a front end connected to a second end of the universal joint and a rear end connected to the valve assembly,
- wherein the support-align member is configured to support the knob, to support the universal joint, and to support the first adjustment shaft.

2. The home appliance of claim 1, wherein movement of the first end of the universal joint in a radial direction from the first adjustment shaft is limited by the joint support of the support-align member, and wherein the first end of the universal joint is prevented from sliding further forward than a predetermined position while the first end is supported by the joint support of the support-align member in such a way that the first end slides in the axial direction.

3. The home appliance of claim 2, wherein a front end of the joint support of the support-align member is integrally connected to the rear end of the shaft support of the support-align member, and the front end of the joint support is provided with a flange that extends radially outward from the rear end of the shaft support and a cylinder that extends rearward from the flange, and wherein an inner diameter of the cylinder is greater than an inner diameter of the rear end of the shaft support.

4. The home appliance of claim 3, wherein the first end of the universal joint is provided with a first shaft connector inserted into an inner space of the cylinder, the first shaft connector is provided with a first tapered surface having a diameter that decreases in the frontward direction, on an outer circumferential surface of a front end thereof, wherein the cylinder is provided with a second tapered surface having an inner diameter that decreases in the frontward direction, on an inner circumferential surface thereof, and wherein an inner diameter of a rear end of the second tapered surface is greater than an outer diameter of a rear end of the first tapered surface.

5. The home appliance of claim 1, wherein the bracket comprises a first portion configured to be connected to the front surface of the panel and fixed to the front surface of the panel, and a second portion disposed further outward than the first portion in a radial direction and connected to the knob ring, wherein the first portion is not exposed in a state in which the knob is disposed on the bracket and is exposed in a state in which the knob is removed from the bracket, as the first portion is disposed at a rear of the knob, and the first portion is fixed to the panel by a fastener inserted from a space in front of the first portion.

6. The home appliance of claim 1, wherein the first adjustment shaft is detachably connected to the first end of the universal joint.

7. The home appliance of claim 6, wherein the first adjustment shaft is provided with a first diameter portion that connects to a first supporting surface of the shaft support provided at a front end of the shaft support, and a second diameter portion that connects to a second supporting surface of the shaft support provided at the rear end of the shaft support, wherein a diameter of the first diameter portion is greater than a diameter of the second diameter portion.

8. The home appliance of claim 7, wherein the first diameter portion and the second diameter portion are connected by an inclined portion having a diameter that decreases from the first diameter portion toward the second diameter portion.

9. The home appliance of claim 1, wherein the shaft support comprises a first support that extends forward from the bracket, and a second support that extends rearward from the bracket, and wherein the joint support of the support-align member is connected to a rear end of the second support.

10. The home appliance of claim 1, wherein the shaft support and the joint support are provided with a first slit that extends from a predetermined position on the shaft support to a rear end of the joint support and cut rearward, wherein the shaft support is provided with a supporting surface configured to support a circumference of the first adjustment shaft, at the rear end thereof, which is a sector in which the first slit is formed, and in a state in which the first adjustment shaft is not inserted into the shaft support, an inner diameter of the supporting surface is less than a diameter of a portion of the first adjustment shaft, supported by the supporting surface.

11. The home appliance of claim 10, wherein the joint support is provided with a second slit that extends to the rear end of the joint support from a position different from the position of the first slit.

12. The home appliance of claim 1, wherein a supporting surface configured to support the first adjustment shaft is provided at the rear end of the shaft support, and a tapering sector having an inner diameter that increases from the supporting surface in the frontward direction is provided on an inner circumferential surface of the shaft support.

13. The home appliance of claim 1, wherein the second adjustment shaft is configured to slide in the axial direction by a first distance between a press position in which a valve of the valve assembly is pressed and a non-press position in which the valve is not pressed, wherein in a state in which the second adjustment shaft is in the non-press position, the first end of the universal joint slides relatively with respect to the second end of the universal joint by a second distance between a third position in which the first end of the universal joint moves rearward and interferes with the second end and a fourth position in which forward movement of the first end is limited by the joint support, and wherein the knob and the first adjustment shaft slide with respect to the bracket in the axial direction by a distance the same as or greater than a total of the first distance and the second distance.

14. The home appliance of claim 1, wherein a size of the through hole is greater than a size of the universal joint.

15. A home appliance, comprising:

a support-align member that includes a bracket, a shaft support coupled to the bracket, and a joint support coupled to the shaft support;

the bracket configured to be disposed outside of the home appliance, configured to cover a through hole in the home appliance, and configured to be fixed to a front surface of the home appliance, the shaft support provided on the bracket, extending in a frontward-rearward direction, and formed in the shape of a tube, and the joint support contacts a rear end of the shaft support;

a knob disposed outside of the home appliance at a front of the through hole and the bracket;

a knob ring connected to the bracket and surrounding a circumference of the knob;

a universal joint rotatably supported by the joint support disposed at the rear end of the shaft support;

a valve assembly disposed at a rear of the universal joint;

a first shaft inserted into and supposed by the shaft support, wherein a front end of the first shaft is connected to the knob and a rear end of the first shaft is connected to a first end of the universal joint, and wherein the first shaft rotates within the shaft support and slides in an axial direction, the first shaft rotating together with the knob and the universal joint; and a second shaft having a front end connected to a second end of the universal joint and a rear end connected to the valve assembly, wherein the support-align member is configured to support the knob, to support the universal joint, and to support the first shaft.

16. The home appliance of claim 15, wherein movement of the first end of the universal joint in a radial direction from the first shaft is limited by the joint support of the support-align member, and wherein the first end of the universal joint is prevented from sliding further forward than a predetermined position while the first end is supported by the joint support of the support-align member in such a way that the first end slides in the axial direction.

17. The home appliance of claim 16, wherein a front end of the joint support of the support-align member is integrally connected to the rear end of the shaft support of the support-align member, and the front end of the joint support is provided with a flange that extends radially outward from the rear end of the shaft support and a cylinder that extends rearward from the flange, and wherein an inner diameter of the cylinder is greater than an inner diameter of the rear end of the shaft support.

18. The home appliance of claim 17, wherein the first end of the universal joint is provided with a first shaft connector inserted into an inner space of the cylinder, wherein the first shaft connector is provided with a first tapered surface having a diameter that decreases in the frontward direction, on an outer circumferential surface of a front end thereof, wherein the cylinder is provided with a second tapered surface having an inner diameter that decreases in the frontward direction, on an inner circumferential surface thereof, and wherein an inner diameter of a rear end of the second tapered surface is greater than an outer diameter of a rear end of the first tapered surface.

19. The home appliance of claim 15, wherein the bracket comprises a first portion configured to be connected to the front surface of the home appliance and fixed to the home appliance, and a second portion disposed further outward than the first portion in a radial direction and connected to the knob ring, wherein the first portion is not exposed in a state in which the knob is disposed on the bracket and is exposed in a state in which the knob is removed from the bracket, as the first portion is disposed at a rear of the knob, and the first portion is fixed to the front surface of the home appliance by a fastener inserted from a space in front of the first portion.

20. The home appliance of claim 15, wherein the second shaft is configured to slide in the axial direction by a first distance between a press position in which a valve of the valve assembly is pressed and a non-press position in which the valve is not pressed, wherein in a state in which the second shaft is in the non-press position, the first end of the universal joint slides relatively with respect to the second end of the universal joint by a second distance between a third position in which the first end of the universal joint moves rearward and interferes with the second end and a fourth position in which forward movement of the first end is limited by the joint support, and wherein the knob and the first adjustment shaft slide with respect to the bracket in the axial direction by a distance the same as or greater than a total of the first distance and the second distance.

* * * * *